United States Patent [19]
Wood

[11] Patent Number: 5,926,125
[45] Date of Patent: Jul. 20, 1999

[54] SYNTHETIC APERTURE RADAR

[75] Inventor: Peter John Wood, Nepean, Canada

[73] Assignee: EMS Technologies Canada, Ltd., Ottawa, Canada

[21] Appl. No.: 09/020,240

[22] Filed: Feb. 6, 1998

[30] Foreign Application Priority Data

Mar. 27, 1997 [CA] Canada ................................. 2201262

[51] Int. Cl.⁶ .................................................. G01S 13/90
[52] U.S. Cl. .............................................. 342/25; 342/101
[58] Field of Search ................................ 342/25, 82, 84, 342/89, 94, 98, 99, 101, 162, 192, 194, 195, 197, 204

[56] References Cited

U.S. PATENT DOCUMENTS

| | | | |
|---|---|---|---|
| 3,790,939 | 2/1974 | Constant | 342/25 |
| 4,067,009 | 1/1978 | Constant | 342/25 |
| 4,551,724 | 11/1985 | Goldstein et al. | 342/25 |
| 4,963,877 | 10/1990 | Wood et al. | 342/25 |
| 5,179,383 | 1/1993 | Raney et a. | 342/25 |
| 5,289,188 | 2/1994 | Chudleigh, Jr. | 342/58 |
| 5,608,404 | 3/1997 | Burns et al. | 342/25 |
| 5,659,318 | 8/1997 | Madsen et al. | 342/25 |
| 5,708,436 | 1/1998 | Loiz et al. | 342/25 |
| 5,777,574 | 7/1998 | Robinson | 342/25 |
| 5,812,082 | 9/1998 | Moreira et al. | 342/25 |
| 5,821,895 | 10/1998 | Hounam et al. | 342/25 |

OTHER PUBLICATIONS

Influence of the SAR Antenna on RADARSAT Image Quality, Nick Shepherd—pp. 196–206—Antem'94.
System Considerations for Active SAR Antennae—Martin–Comelo et al—pp. 65–68—Antem'96.
Design of Slotted Waveguide Arrays for the RADARSAT SAR Antenna—P.J. Wood.

Primary Examiner—John B. Sotomayor
Attorney, Agent, or Firm—Pascal & Associates

[57] ABSTRACT

A method of operating a SAR system comprised of emitting a sequence of pulses toward a target, alternating characteristics of pairs of successive pulses, receiving reflected pulses from the target, passing the received reflected pulses through a filter, modifying parameters of the filter in step with the transmitted pulses to match the characteristics of the successive pulses in the event a time delay between pulse transmission and reception of a pulse reflected from a target is a fraction greater than an even multiple of a pulse period, and modifying the parameters of the filter in anti-synchronism with the successive pulses in the event a time delay between pulse transmission and reception of a pulse reflected from a target is less than a fraction greater than an even multiple of a pulse period.

20 Claims, 3 Drawing Sheets

SYNTHETIC APERTURE RADAR

FIELD OF THE INVENTION

This invention relates to the field of space-based synthetic aperture radar (SAR) systems.

BACKGROUND TO THE INVENTION

In space-based synthetic aperture radars of conventional design, the antenna must be large enough to suppress ambiguities in the radar image. For example, the antenna size for the C-band Canadian Radarsat satellite is 15 m, as described in P. J. Wood, "Design of Slotted Waveguide Arrays for the Radarsat SAR Antenna", Symposium on Antenna Technology and Applied Electromagnetics (ANTEM), Ottawa, August 1994, pp 188–195.

The antenna size may be reduced while still using conventional SAR processing algorithms. This implies compromising the swath width (which determines the amount of mapping data which can be generated in a given time), or the image quality, as described in L. M. Martins-Camelo et al, "Systems Considerations for Active SAR Antennae", Symposium on Antenna Technology and Applied Electromagnetics (ANTEM), Montreal, August 1996, pp 65–68.

FIG. 1 illustrates the principle of operation of a satellite which uses SAR. Two distinct types of imaging process are involved, one for the along-track (or 'azimuth'), the other for cross-track (or 'elevation') case.

As shown, 'elevation' image is mapped across the coverage swath. This swath lies totally to one side of the satellite track, and may typically be 100 Km. wide. The antenna beam 1 transmitted from antenna 3 is usually several degrees wide in the elevation plane, and illuminates all of the coverage swath. However, different image pixels across the swath can be distinguished by the different time delays of the corresponding received radar pulses. Radar signals which are reflected back from the outer edge of the swath (the edge furthest from the satellite track) travel a longer distance and therefore take a longer time to return to the satellite. The elevation resolution of the ground image is determined by the smallest detectable difference in timing. This resolution is of the order of 20 m. in the case of the Canadian Radarsat satellite.

In the azimuth plane, the antenna beam is usually much narrower. In the Radarsat case, it is 0.2 degrees wide. On the ground, the beam stretches some 3 Km. across the along-track dimension. The 3 km. wide spot moves with the satellite, to achieve along-track mapping. Because the satellite is moving rapidly around its orbit, the radar returns are subject to the classical 'Doppler effect'. Thus, for a return from a part of the ground which is ahead of the spacecraft in relation to its motion, the spacecraft is moving towards the ground. As a result, the frequency of the radar reflection is increased. Conversely, for a return from a part of the ground which is behind the spacecraft, the spacecraft is moving away from the ground, and the frequency of the radar reflection is decreased. The SAR processor uses small changes in frequency of the received signal to distinguish between radar targets which are close together in the along-track dimension. Thus, it is able to subdivide the 3 Km. along-track spot into many azimuth pixels. In the Radarsat case, an azimuth resolution of the order of 20 m. is achieved in this way.

The minimum size for a SAR antenna has been largely dictated by the need to avoid 'ambiguities'. When no ambiguities are present, a large signal level at a particular pixel of a SAR-generated image implies that there is a strong reflection from the radar target at the one unique point on the illuminated swath which corresponds to that pixel. However, when ambiguities are present, two or more different target positions exist which could give rise to a signal at the same image pixel. For a SAR on a spacecraft, these different positions typically lie some hundreds of kilometers apart on the earth's surface.

A key system parameter for a SAR is the PRF (Pulse Repetition Frequency). To avoid azimuth ambiguities, the received signals must be sampled at at least the rate implied by the classical Fourier sampling theorem (two samples per cycle), bearing in mind the bandwidth of the Doppler spectrum. As already described, the bandwidth of the Doppler spectrum is essentially proportional to the along-track length of the ground footprint of the antenna beam.

A large PRF implies liberal sampling. The beam footprint can then be large in the azimuth plane, while still maintaining ambiguity-free azimuth image processing. Under these circumstances, the azimuth dimension of the antenna can be relatively small.

The pulse period (time interval between pulses) may be calculated as the reciprocal of the PRF. In the elevation plane, ambiguities tend to occur when, in addition to the desired radar targets, other target positions exist which generate reflected pulses which arrive an integral number of pulse periods before or after the reflection from the desired target. Thus, a large PRF will tend to cause range ambiguities for the elevation plane image processing.

In the past, range ambiguities have been overcome by reducing the swath width of the radar beam. This however implies that the antenna must generate a narrow elevation beam, and hence its elevation aperture dimension must be large.

It has been determined that, to avoid major ambiguity problems, the area of the SAR antenna aperture must exceed a particular value. In principle, this value depends upon certain parameters of the spacecraft orbit, specifically spacecraft platform velocity and orbit height. In practice, however, these latter parameters end to be fairly similar for all spacecraft SAR applications.

In principle, the width of a SAR swath can ideally be such that the change in delay of the received signals from the near side of the swath to the far side of the swath approaches one pulse period. In practice, spacecraft SAR systems are often designed for a swath width of about one half of the ideal case. Under these conditions, the prior art SAR antenna must always have an aperture area of at least 10 square meters at C-band, or 40 square meters at L-band. Even at C-band the size of the SAR antenna becomes one of the principal factors determining the size of the satellite bus. At L-band or lower frequencies, the size of the antenna tends to be a major disincentive, discouraging implementations at these frequencies.

It will thus be seen from the above that there is a fundamental constraint on aperture area for a SAR antenna, and that this constraint comes about via a combination of limitations set by the SAR azimuth processing algorithms, and the SAR elevation processing algorithms. For prior art SAR's, the properties of the antenna beam are used to suppress both azimuth and elevation ambiguities.

Nominally, a spacecraft SAR needs to use a radar pulse whose effective time duration is very short, in order to make it possible to detect very small arrival time differences, and create an image which has a high resolution in the elevation plane. However, as shown in FIG. 2, it is standard practice to transmit a sequence of swept-frequency pulses 5 generated in a pulse generator 7, called chirp pulses.

The radar receiver incorporates a 'matched filter' 9 to compress the received pulses 11. For the type of implementation shown in FIG. 2 in which an 'upwards chirp' is used (the frequency increases during the pulse), the matched filter 9 delays the components of the pulse which are at higher frequencies, so that all frequency components add coherently at its output. Conversely, for a 'downwards chirp' case, the matched filter will delay the components of the pulse which are at lower frequencies. Thus, the matched filter transforms the very low-level, wide, swept-frequency pulse 11 into a single, very narrow pulse 13 which has a much larger amplitude.

In a prior art SAR design, the parameters of the expanded swept frequency pulse, and the matched filter which compresses it, have been fixed quantities.

In general, when pulse compression is used in a radar, a relatively long pulse is transmitted, the length of the pulse ensuring that the radar echo contains enough energy to be easily detectable by the receiver. In order that the echo can be timed very accurately, even after the pulse has perhaps been distorted as a result of reflection from a radar target, the long pulse is configured in some special way, so that it is possible to distinguish each individual small part of it from all the other small parts. One way of doing this is to change the frequency during the pulse (the 'chirp pulse'), so that each part of the pulse has a different frequency. Another (coded sub-pulses) is to split the pulse into a long series of many short sub-pulses. The sub-pulses form a sequential code of nominally '0' and one values. For example, such a sequence might be

0110100 although in practice a real sequence would be very much longer. The code is carefully configured so as to avoid embedding any repeated sequence of '0's and '1's in it.

In the basic 'coded sub-pulse' scheme, the subpulses amplitude-modulate the radar frequency carrier, essentially turning it on and off. In another scheme, the carrier is transmitted at all times, but the sub-pulses change the phase of the radar-frequency signal, a '0' sub-pulse giving one phase, and a '1' sub-pulse giving a different phase. Finally, in yet another version (some times referred to as pulse compression via phase codes), there are in general several different phase values, not just two.

All these schemes have in common that a specific 'code' is transmitted: for example an upwards frequency sweep of 20 MHz extent for a chirp pulse, or a specific sequence of '1's and '0's for the coded sub-pulse approach. There is then always a matched filter. The filter is designed to look for precisely the code that has been transmitted, and to extract its all-important timing information.

U.S. Pat. No. 5,608,404 to Burns et al describes a system in which either one or more than one of center frequency, starting phase, and chirp rate transmitted pulses are varied on a pulse-to-pulse basis in response to radar motion. It is thus restricted to a real time system. Pulse-to-pulse variation of these specific parameters is effected between one azimuth sub-aperture and the next. Thus the chirp rate actually remains constant for a group of pulses which are within one subaperture.

SUMMARY OF THE INVENTION

To avoid the antenna aperture area constraint described above, the present invention suppresses the elevation ambiguities in a manner which is independent of the antenna. The invention provides for the parameters of the swept-frequency pulse to be alternatingly switched from pulse to pulse while the radar is operating. This also is a different approach from the Burns et al scheme, and is applicable to both delayed transmission and real time system.

In the simplest embodiment, there are two different types of frequency sweep, one sweeping upwards and the other downwards. These two types are invoked for alternate transmitted pulses. The matched filter characteristics are also switched pulse-by-pulse. For coverage swaths where the 'there and back' radar pulse delay is a fraction greater than an even multiple of a pulse period, the matched filter is switched in direct synchronism with the transmitted pulse. For other coverage swaths, it is switched in anti-synchronism. In this latter case, when the transmitted pulse has an upwards frequency sweep, the matched filter is set to accept a downwards frequency sweep, and vice-versa.

In accordance with an embodiment of the invention, a method of operating a synthetic aperture radar (SAR) system which is comprised of a pulse generator, an SAR antenna for receiving and transmitting pulses from the pulse generator, and a filter for processing pulses received by the antenna which have been reflected from a target, comprises the steps of generating alternating pulses of upward frequency sweeping and downward frequency sweeping chirps, and simultaneously changing parameters of the filter from pulse to pulse to match either the upwardly frequency sweeping or downwardly frequency sweeping characteristics of the pulses generated by the pulse generator.

In accordance with another embodiment, a method of operating a SAR system is comprised of emitting a sequence of pulses toward a target, alternating characteristics of pairs of successive pulses, receiving reflected pulses from the target, passing the received reflected pulses through a filter, modifying parameters of the filter in step with the transmitted pulses to match the characteristics of the successive pulses in the event a time delay between pulse transmission and reception of a pulse reflected from a target is a fraction greater than an even multiple of a pulse period, and modifying the parameters of the filter in anti-synchronism with the successive pulses in the event a time delay between pulse transmission and reception of a pulse reflected from a target is less than a fraction greater than an even multiple of a pulse period.

In accordance with another embodiment, a synthetic aperture radar (SAR) system is comprised of a pulse generator for generating pulses to which successive pulses have alternating characteristics, an antenna for transmitting pulses generated by the pulse generator and for receiving pulses reflected from a target, a filter for translating the received pulses, apparatus for changing characteristics of each of successive pulses, and apparatus for changing parameters of the filter in step with the pulses for translating the received pulses.

Thus the pulse shape and filter are programmed to cause their parameters to be changed with successive pulses, rather than when the radar beam is diverted to map a different coverage swath as in the prior art.

Thus the present invention makes it possible for example to differentiate between radar returns which originate from even-numbered transmit pulses, and those that originate from odd-numbered transmit pulses. Elevation ambiguities are then suppressed by the matched filter. The antenna no longer needs to have a narrow pattern to achieve the suppression, and therefore it can be smaller than in the prior art.

In this patent application, the term "filter" is used in its most generic sense. For chirp pulses, the matched filter is simply a conventional filter. That is, it is a device which differentiates between parts of the signal that are inputted to it, on the basis of their frequencies. Such a filter may then be implemented by some form of analogue technology. For example, a matched filter for chirp radar signals is often implemented as a SAW (surface acoustic wave) device. However, for coded sub-pulses, the matched filter needs to be implemented as a digital processor. Essentially its purpose is then to establish the time delay of the nominal transmitted code which results in the best possible digital correlation with sub-pulses for the actual received radar signals.

BRIEF INTRODUCTION TO THE DRAWINGS

A better understanding of the invention will be obtained by considering the detailed description below, with reference to the following drawings, in which:

FIG. 1 is an isometric diagram of an antenna, antenna beam and beam footprint of a typical SAR system, FIG. 2 is a block diagram illustrating the pulse waveforms for a prior art SAR system, and FIG. 3 is a block diagram illustrating an embodiment of the present invention.

DETAILED DESCRIPTION OF EMBODIMENTS OF THE INVENTION

Figure 1:
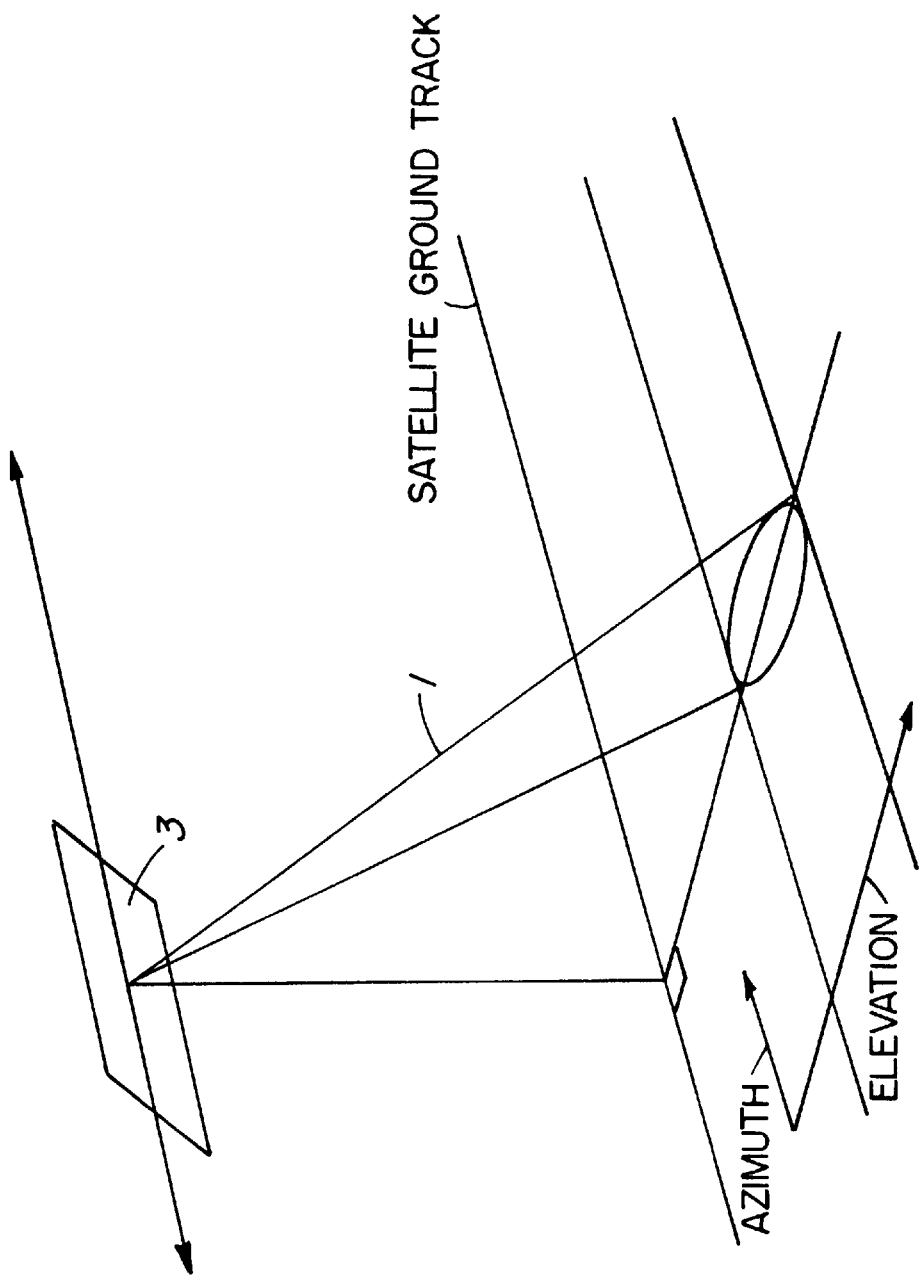
Figure 2:
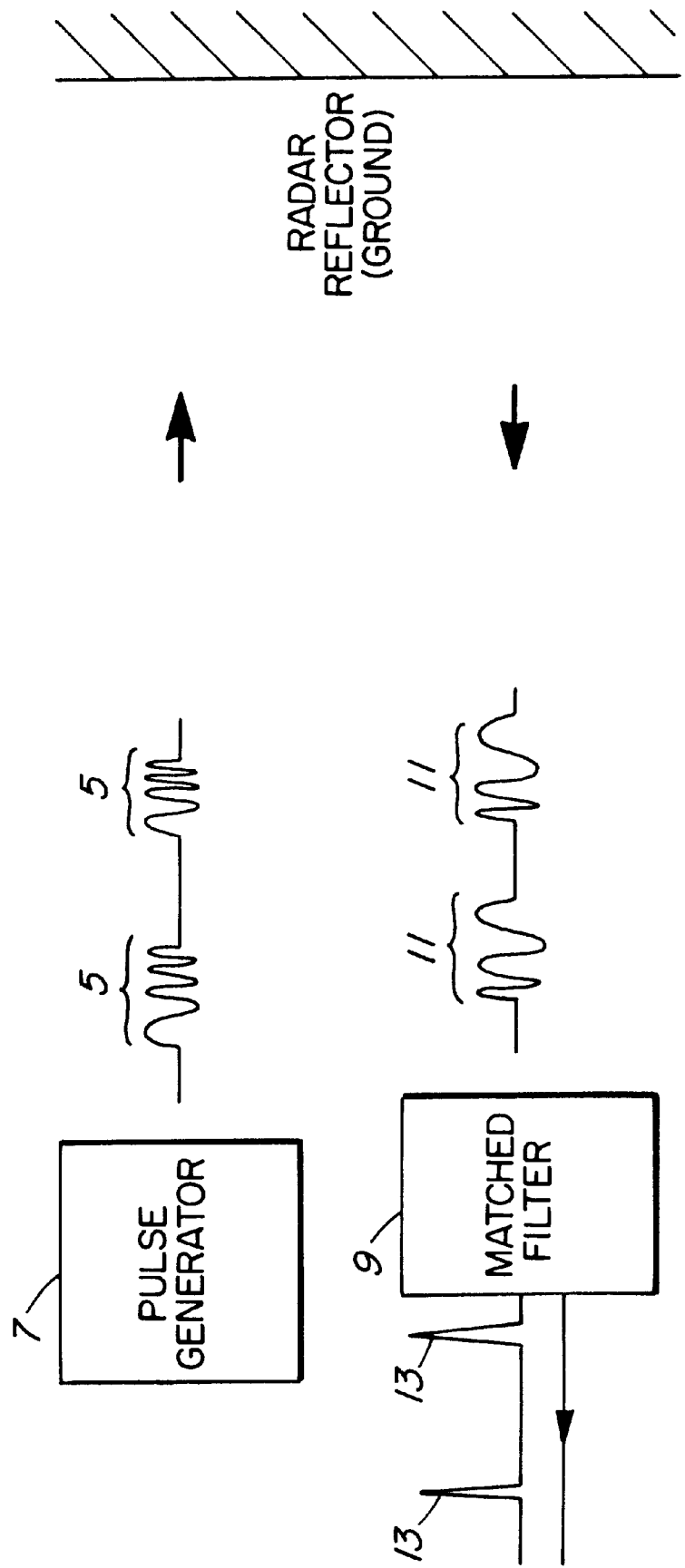
Figure 3:
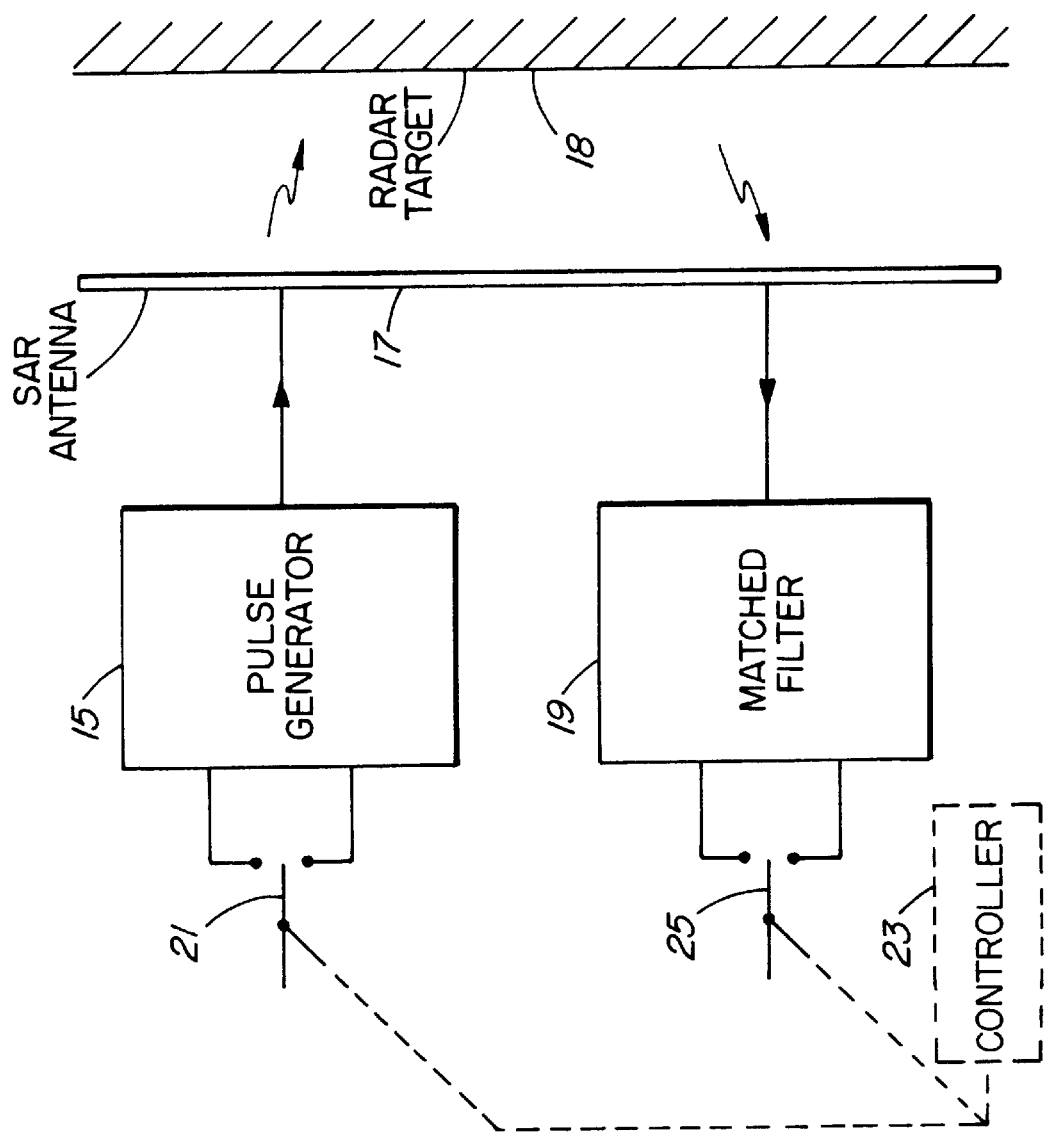

Turning to FIG. 3, a pulse generator 15 is shown, which generates a succession of pulses such as chirp pulses, and provides them to an antenna 17 for emission toward a target 19. A reflected pulse is received by the antenna and is applied to a receiver which includes a matched filter 19.

In accordance with the invention, each successive pulse has a different characteristic than the preceding pulse, the characteristics alternating between successive pulses. This can be effected by implementing a switch 21 connected to the pulse generator that switches a pulse generator parameter, circuit or control circuit of the pulse generator.

In one kind of chirp generator implementation, the chirp is generated semi-digitally. Essentially, a digital integrated circuit chip computes successive alternating digital values of the chirp waveform with the help of a look-up table held in a digital memory. The look-up table contains values of the trigonometric 'sine' function. The digital output signals of the integrated circuit form patterns of digital bits which are fed to the DAC (digital-to-analogue converter chip). The DAC gives an analogue output which is input to a filter circuit which removes all traces of the digital sampling frequency. In some cases the filter output can provide the final chirp pulse. In other cases, these being cases where the frequency sweep of the chirp is too fast to be generated with available digital integrated circuit technology, the digital circuits described can be used to generate a 'small sweep' chirp, but a frequency-multiplier circuit is then introduced to create the final, 'large sweep' chirp. This kind of semi-digital generation scheme can also be used with types of pulse compression other than 'chirp': sub-pulse codes, or phase codes. The control program and the look-up table determine the type of pulse compression which is implemented.

The switch 21 can be controlled by a controller 23, which is programmed to control switch 21 as to chirp (pulse) timing, and whether the chirp should be of increasing or decreasing frequency.

A switch 25 is also controlled by control 23, which control parameters of the matched filter 19 to translate the reflected pulses.

The controller should cause switches 21 and 25 to cause the characteristics of each successive generated pulse to be different from the preceding pulse to alternate with the preceding pulse, and to cause the parameters of the matched filter to match the characteristics of the received reflected pulse, in step or antistep with the pulses.

In one embodiment, there are two different types of chirps generated, one with increasing frequency and one with decreasing frequency, which are transmitted as alternate pulses in a sequence of pulses. The matched filter characteristics are also switched pulse-by-pulse.

For coverage swaths where the transmission and reflection delay is a fraction greater than an even multiple of a pulse period, the matched filter is controlled by controller 23 to be switched in direct synchronism with the transmitted pulses.

For other coverage swaths, for example where the transmission and reflection delay is a fraction smaller than an even multiple of a pulse period, the matched filter is controlled by controller 23 to be switched in anti-synchronism, that is, when the transmitted pulse has an upward (i.e. increasing) frequency sweep, the matched filter is set to accept a downward (i.e. decreasing) frequency sweep, and vice-versa.

It will thus be seen that the present invention has made it possible for example to differentiate between radar returns which originate from even-numbered transmit pulses, and those that originate from odd-numbered transmit pulses. Elevation ambiguities are then suppressed by the matched filter. The antenna no longer needs to have a narrow pattern to achieve the suppression, and therefore it can be smaller than in the prior art.

Thus the onus of suppressing near-in elevation ambiguities falls on the matched filter, rather than on the antenna as in the prior art. For the simplest embodiment in which two different pulse forms are used, the two range ambiguity responses immediately on either side of the coverage swath are suppressed by the matched filter, and it has been found possible to reduce the antenna aperture area by a factor of about five.

The received beam can be scanned to track the elevation angles of the returned pulses. This would result in enhanced antenna gain and signal-to-noise ratio properties of the system, compensating at least in part for the reduced antenna size.

It should also be noted that instead of using chip pulses, phase-coding or other forms of coding can be used. Further, instead of using only two forms of pulse shapes, more than two can be used. Indeed, more than two different pulse shapes can permit an even greater reduction in antenna size than the reduction of a factor of three described above. Just as the invention can utilize the transmission of even pulses and odd pulses with different directions of chirp, it can utilize transmission of successive pulses, or even and odd pulses with different sub-pulse or pulse codes. The present invention thus opens the way the SAR system payloads for small satellite buses.

A person understanding this invention may now conceive of alternative structures and embodiments or variations of the above. All those which fall within the scope of the claims appended hereto are considered to be part of the present invention.

I claim:

1. A method of operating a synthetic aperture radar (SAR) system which is comprised of a pulse generator, an SAR antenna for receiving and transmitting pulses from the pulse generator, and a filter for processing pulses received by the antenna which have been reflected from a target, comprising the steps of generating alternating pulses of upward frequency sweeping and downward frequency sweeping chirps, and simultaneously changing parameters of the filter from pulse to pulse to match either the upwardly frequency sweeping or downwardly frequency sweeping characteristics of the pulses generated by the pulse generator.

2. A method as defined in claim 1 in which the filter is switched synchronously with the generated pulses.

3. A method as defined in claim 1 in which the filter is switched anti-synchronously so that the filter is downward frequency sweeping when the chirp is upward frequency sweeping and in which the filter is upward frequency sweeping when the chirp is downward frequency sweeping.

4. A method as defined in claim 1 in which the filter is switched synchronously with the generated pulses when the pulse transmission and return time is a fraction greater than an even multiple of a pulse period, and otherwise the filter is switched anti-synchronously with respect to the generated pulses.

5. A method as defined in claim 1 in which the antenna has a size of about 4 square meters at C-band.

6. A method as defined in claim 1 in which the antenna has a size of about 15 square meters at L-band.

7. A method as defined in claim 1 in which the antenna has a size which is unrelated to suppression of pulse transmission and return time elevation ambiguities.

8. A method as defined in claim 1 including scanning the antenna beam to track elevation angles of received pulses.

9. A method of operating a SAR system comprising emitting a sequence of pulses toward a target, alternating characteristics of pairs of successive pulses, receiving reflected pulses from the target, passing the received reflected pulses through a filter, modifying parameters of the filter in step with the transmitted pulses to match the characteristics of the successive pulses in the event a time delay between pulse transmission and reception of a pulse reflected from a target is a fraction greater than an even multiple of a pulse period, and modifying the parameters of the filter in anti-synchronism with the successive pulses in the event a time delay between pulse transmission and reception of a pulse reflected from a target is less than a fraction greater than an even multiple of a pulse period.

10. A method as defined in claim 9 in which successive pulses are alternating upward frequency sweeping and downward frequency sweeping chirps.

11. A method as defined in claim 9 in which successive pulses are alternating even and odd pulses each comprised of different sub-pulse or phase codes.

12. A synthetic aperture radar (SAR) system comprising a pulse generator for generating pulses to which successive pulses have alternating characteristics, an antenna for transmitting pulses generated by the pulse generator and for receiving pulses reflected from a target, a filter for translating the received pulses, means for changing characteristics of each of successive pulses, and means for changing parameters of the filter in step with the pulses for translating the received pulses.

13. A system as defined in claim 12 including means for matching parameters of the filter with the characteristics of the pulses in step therewith.

14. A system as defined in claim 12 including matching parameters of the filter with alternate ones of the pulses in anti-synchronism therewith.

15. A method as defined in claim 12 in which successive pulses are alternating even and odd pulses each comprised of different sub-pulse or phase codes.

16. A system as defined in claim 13 in which the pulses are alternately upward frequency sweeping and downward frequency sweeping chirps.

17. A system as defined in claim 12 including means for generating and transmitting more than two successive pulses having more than two corresponding different pulse characteristics.

18. A system as defined in claim 17 in which successive pulses are comprised of different sub-pulse or phase codes.

19. A system as defined in claim 12 including means for phase coding the pulses.

20. A system as defined in claim 12 in which the antenna has a size which is unrelated to suppression of elevation ambiguities caused by pulse transmission and return times.

* * * * *